United States Patent
Mérant et al.

(10) Patent No.: US 7,275,359 B2
(45) Date of Patent: Oct. 2, 2007

(54) CLEANING ARRANGEMENT FOR A FRUIT HARVESTING MACHINE

(75) Inventors: Jean-Camille Mérant, Meigné-sous-Doué (FR); Christophe Robert Defurne, La Chapelle-Hermier (FR)

(73) Assignee: CNH France S.A. (FR)

( * ) Notice: Subject to any disclaimer, the term of this patent is extended or adjusted under 35 U.S.C. 154(b) by 305 days.

(21) Appl. No.: 10/504,098

(22) PCT Filed: Feb. 11, 2003

(86) PCT No.: PCT/EP03/01396

§ 371 (c)(1),
(2), (4) Date: May 5, 2005

(87) PCT Pub. No.: WO03/067959

PCT Pub. Date: Aug. 21, 2003

(65) Prior Publication Data

US 2005/0229575 A1    Oct. 20, 2005

(30) Foreign Application Priority Data

Feb. 13, 2002  (EP) ................................ 02290349

(51) Int. Cl.
*A01D 46/00* (2006.01)
(52) U.S. Cl. .................................................. 56/328.1
(58) Field of Classification Search ............... 56/327.1, 56/328.1, 330, 331, 340.1; 426/599, 590
See application file for complete search history.

(56) References Cited

U.S. PATENT DOCUMENTS 5,152,129 A * 10/1992 McKenna, Jr. ............. 56/328.1
6,990,794 B2 * 1/2006 Merant ....................... 56/328.1

FOREIGN PATENT DOCUMENTS

EP    1192850 A1 *  4/2002
FR    2298266 A   *  9/1976

* cited by examiner

*Primary Examiner*—Árpád Fábián Kovács
(74) *Attorney, Agent, or Firm*—Rebecca Henkel (57) ABSTRACT

A fruit harvesting machine comprises a harvesting assembly for detaching crop material, comprising fruit and foliage from trees, shrubs and the like standing on said field. A conveyor assembly receives the detached fruit and foliage, together with juice from said fruit, and transports the fruit either directly or indirectly to a container. An extraction fan is installed adjacent a section of said conveyor assembly for separating said foliage from said detached fruit. The conveyor assembly comprises a grate for retaining thereon solid fruit portions and for allowing passage therethrough of said juice and a conveyor for engaging and moving said detached solid fruit portions and foliage along said grate mechanism towards the extraction mechanism. The conveyor assembly further comprises a channel installed below said grate mechanism for receiving said juice. The fruit portions and foliage is subject to the air stream of the extraction fan, while the juice has migrated directly to the bottom of the channel such that it cannot be sucked into the fan.

28 Claims, 6 Drawing Sheets

FIG. 6

CLEANING ARRANGEMENT FOR A FRUIT HARVESTING MACHINE

FIELD OF INVENTION

The present invention relates to machines for harvesting fruit grown on trees or shrubs, such as grapes, berries, coffee beans, olives and the like. In particular it relates to apparatus for conveying the harvested crop material to mechanism for removing material other than fruit, such as foliage, from this crop material.

BACKGROUND OF INVENTION

Fruit harvesting machines such as grape harvesters commonly are equipped with a shaker assembly which straddles a row of shrubs or vines. The shaker assembly comprises sets of shaker rods which are oscillated to beat or shake the vines vigorously to detach the grapes or bunches of grapes from the vine shrubs. The detached fruit is guided into conveyors on both sides of the vines and transported by these conveyors to bins or containers on top of the grape harvester. When the machines reach the end of a vine row, the bins may be unloaded into a towed cart for further transport to the winery.

The action of the shaker rods on the vines also detaches some foliage therefrom. The loose leaves and leaf portions are equally received in the conveyors and are conveyed along with the grapes towards the bins. Conventionally the harvesting machine is equipped with cleaning mechanism for separating the leaves and other foreign material such as detached wood from the fruit. For example the New Holland Braud grape harvester model SB64 has below the upper run of each conveyor an transverse apron conveyor for receiving the detached crop material and tipping the same into a bin on each side of the harvester. Over the discharge end of the apron a fan has been installed for extraction of the leaves from the crop material on the apron. The cleaning action is enhanced by the air stream acting on the crop during its fall into the bins.

It has been observed that the fan not only sucks away the foliage, but also drops of valuable fruit juice. The fruit juice is produced by grape berries which are burst under the impact of the shaker rods. At the discharge end of the apron conveyor, the air flow sucks away the juice drops and ejects them together with the leaves through a duct aside the machine. These losses can be reduced by decreasing the fan speed in order to diminish air speeds, but such action inevitably also reduces the proportion of foreign material which is removed from the crop.

FR-A-2.686.530 proposes to provide the fruit harvester with a cleaning system comprising inwardly extending rods retaining the leaves, a mesh funnel installed beneath the rods retaining the grape bunches and the berries, and a full plate funnel receiving the fruit juice which migrated between the rods and through the mesh funnel. Such system is voluminous in size and prone to pollution by crop material sticking to the inner or outer funnels. Furthermore there is no easy access for cleaning the polluted components.

FR-A-2.298.266 discloses a conveyor and cleaning system including conveyor cups or buckets which are provided with transverse ribs for retaining thereon the leaves. Loose grapes and juice are received in tub sections below or between the ribs. The buckets are provided with air inlets on their sides for allowing an effective upward air stream removing the leaves from the ribs. Such arrangement drastically reduces the conveying capacity of the buckets. Furthermore the lower section of the buckets is partially closed such that crop and other material can easily accumulate therein, while access for cleaning is seriously hindered.

FR-A-2.795.599 shows a mesh conveyor installed above a container, the conveyor allowing the passage therethrough of loose berries and juice and conveying grapes and leaves towards an extraction fan. In order to prevent accumulation of crop material between the upper and lower runs of the conveyor, the latter comprises movable louvers which present smaller meshes in their upper run and larger meshes in their lower run. Such apparatus requires frequent cleaning of the conveyor to ensure that the louvers remain movable and do not get stuck in the one or other position by the drying juice.

SUMMARY OF INVENTION

It is an object of the present invention to remedy to the problems indicated above and to provide a conveyor and cleaning arrangement which shows improved separation capability. The arrangement should effect a reduction of fruit juice losses while being less susceptible to pollution by sticking or caught crop material.

According to the invention there is provided a fruit harvesting machine, comprising:

a frame equipped with mechanism for travelling the frame over a field;

a harvesting assembly for detaching crop material, comprising fruit and material other than fruit, from trees, shrubs and the like standing on said field;

a conveyor assembly for receiving said detached crop material and transporting said fruit either directly or indirectly to a container; and cleaning mechanism installed adjacent a section of said conveyor assembly for removing said material other than fruit from said detached crop material;

characterised in that said conveyor assembly comprises:

a stationary grate mechanism for retaining thereon solid portions of said crop material and having apertures allowing passage therethrough of juice from said fruit;

a movable conveyor mechanism comprising spaced crop-engaging elements for engaging and moving said solid crop portions along said grate mechanism towards said cleaning mechanism and allowing passage inbetween, the conveyor mechanism being permeable for allowing the passage of said juice therethrough.

In such configuration, the juice can migrate to the area below the conveyor mechanism, shielded from the action of the cleaning mechanism, while the bunches and leaves are conveyed along a separate path within the action range of the cleaning mechanism, e.g. an extraction fan. This allows a more forceful action of the fan on the leaves, while avoiding the intake and disposal of drops of fruit juice. The cavities of the conveyor may also be adapted for allowing the passage of loose berries, such that also the part of the crop constituted by the loose berries is not subject to the action of the cleaning mechanism.

The grate may be constituted by a plurality of slats, bars or other narrow, longitudinal members, extending parallel to each other in the normal direction of transport of the conveyor. In this manner the crop-engaging elements can move the bunches and leaves in a steady manner toward the extraction fan. As the grate is contacted by biological material, it preferably is made out of corrosion resistant material, e.g. stainless steel or composite material. In a simple, yet sturdy embodiment, the grate is cut out of a metal sheet.

The conveyor mechanism may have an upper run which is equidistant to the grate and in which the conveyor teeth extend through the grate for moving the bunches and foliage towards the extraction fan. In the lower run the conveyor teeth may extend into the channel for moving the bunches, berries and juice along the channel bottom towards the bin. Such conveyor assembly has two active runs in which crop material is moved. In the lower run the tip of the conveyor teeth may sweep the channel bottom in order to move all juice towards the bin.

Grape bunches conveyed over the grate may pass to the bottom of the channel through a passage area provided at the end of the grate. In this manner the bunches can be moved to the bin by the same mechanism as those moving the loose berries and the juice.

The grate slats may be spaced to allow for passage of loose berries. Also the rakes which engage the crop, may be spaced to preclude that they hinder the passage of the loose berries to the channel bottom.

The crop-engaging elements may be constituted by transverse slats or teeth on transverse slats. The slats may be driven by flexible, endless drive mechanism, such as chains or belts. Advantageously the chains or belts are provided along the side walls of the channel, where they do not hinder the passage of crop material.

Adjacent the extraction fan, the grate may have an upwardly inclined portion in order to improve the action of the fan on the remaining crop material. In order to maintain a fixed distance between the path of the conveyor and the grate, the side walls of the channel may be provided with guide mechanism, e.g. guide plates, along which the chains are trained.

The grate and conveyor mechanism may be combined into a sub-assembly which can installed and removed as a whole from the harvesting machine. Where crop material is supplied from two sides of the machine, it is advantageous to us two opposite conveyor sub-assemblies transporting the foliage to a single extraction mechanism installed over both end portions of the grates. The extracted leaves may then be deposited through a single channel behind the harvesting assembly, where it does not interfere with further harvesting operations.

BRIEF DESCRIPTION OF DRAWINGS

A fruit harvesting machine in accordance with the present invention will now be described in greater detail, by way of example, with reference to the accompanying drawings, in which.

DETAILED DESCRIPTION OF THE PREFERRED EMBODIMENT

In the following description "right hand" and "left hand" references are determined by standing at the rear of the harvester and facing in the direction of normal forward travel. It is also to be understood that, throughout this description, terms such as "forward", "rearward", "upward", "downward", etc. are words of convenience and are not be construed as limiting terms.

Figure 1:
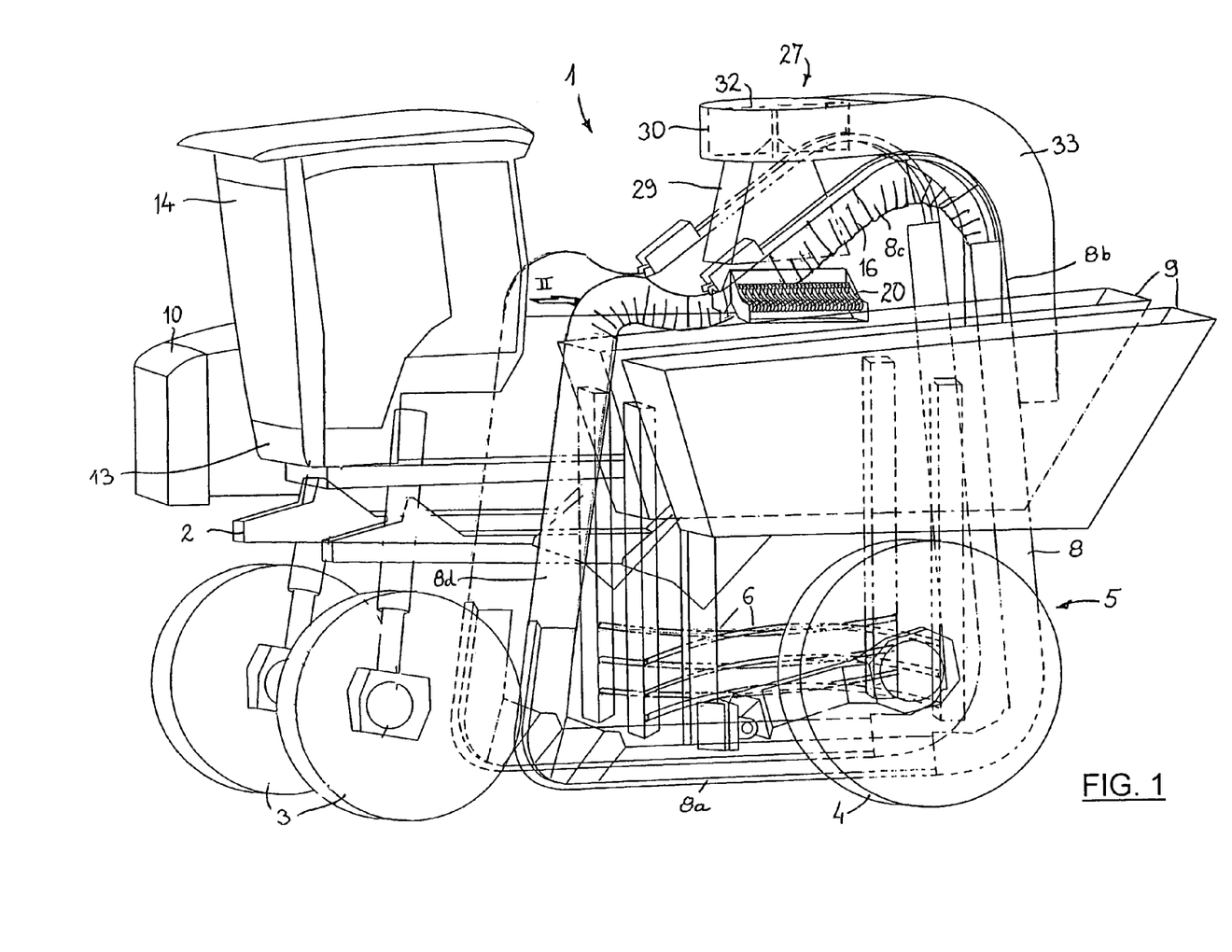
FIG. 1 is a perspective view of a harvesting machine fitted with a pair of bucket conveyors and transverse conveyors and an extraction fan installed over said transverse conveyors.

The fruit harvesting machine shown in FIG. 1 is a grape harvester, generally indicated by reference numeral 1 and comprising a chassis or main frame 2, provided with front steerable wheels 3 and rear wheels 4. Both the front wheels 3 and the rear wheels 4 are driven for moving the frame 2 over the ground. It is also conceivable to replace the wheels with other ground-engaging members such as tracks. The frame 2 is in the form of a gantry in order to be able to straddle a row of plants or shrubs, such as grape-vines. In known manner, the frame 2 carries a harvesting assembly 5, comprising two opposed sets of shaker rods 6 for dislodging the grapes from the vines and two endless elevator conveyors 8 for collecting the detached grapes and conveying them to two storage tanks or bins 9 on both sides of the harvester 1. The harvesting assembly may be affixed to the main frame 2, but preferably it comprises a subframe (not shown) which is suspended through a pair of central, longitudinal pivots from the top of the frame. The elevator conveyors 8 are equally attached to the subframe of the harvesting assembly. The pivotal connection of the subframe allows for oscillation of the harvesting assembly 5 and conveyors 8 in order to adjust to small deviations of the line of the row of vines. The frame 2 further carries an engine 10 providing the power necessary to drive the various active members of the harvesting assembly 5 and the conveyors 8 and also providing motive power to the wheels 3, 4, since the harvester 1 is of the self-propelled type.

The subframe and the harvesting assembly 5 may be fixed in a permanent manner to the main frame 2 of the machine, or else, they may be made in the form of a removable assembly which is detachably affixed to the main frame 2, so as to be capable of being replaced by other equipment or accessories, such as spraying equipment, pruning equipment, equipment for tilling the ground, etc.

The driving and harvesting functions of the vehicle are controlled by the operator from an operator's platform 13, which is attached to the front portion of the frame 2 above the left steering wheel 3. To increase the comfort of the operator, an environmentally insulated cab 14 is provided which surrounds the position of the operator on the platform 13.

The elevator conveyors 8 each form a closed loop around the harvesting assembly 5 and comprise each a closed chain provided with a series of interconnected cups or buckets 16. Preferably the bottom runs 8a of the two conveyors 8 are adjacent to each other and guided on either side of the vine row so as to clamp the foot of the vines and capture the crop material detached by the shaker assembly as described in GB-A-2.004.172. The vertical rear runs 8b and front runs 8d of the elevator conveyors 8 diverge upwardly and outwardly from the longitudinal axes of the bottom runs 8a to clear the passage of the upper portion of the plants into and out of the harvesting assembly 5. The velocity of the bottom runs 8a in relation to the frame 2 is equal and opposite to the velocity of the machine along the vine row, such that there is no relative movement of the bottom runs 8a to the stems of the plants which they enclose. Such arrangement precludes premature wear of the buckets 16 and damages to the vines. The upper edges of the buckets are flexible and match with the edges of the buckets of the opposite conveyor 8, such that conveniently seal the space below the harvesting assembly 5. The edges also neatly enclose the stems of the vines such that no crop material can fall to the ground.

When the conveyors 8 enter their upper run 8c the buckets 16 are tipped over to deposit their contents onto a pair of conveyor assemblies 20, described in further detail hereinafter. These conveyor assemblies 20 transport the crop material in a transverse direction to the bins 9. A longitudinally arranged divider auger (not shown) installed below the discharge end of each apron conveyor 20 assures the proper distribution of the grapes into the bins 9.

Extraction mechanism 27 have been installed above the inward ends of the transverse conveyor assemblies 20 for removal of the foliage from the harvested crop material. The extraction mechanism 27 comprise a hood 29 directed to the conveyor assemblies and an extraction fan 30 registering with the top of the hood. The fan contains a rotor 32 can be driven at various speeds, e.g. by a variable hydraulic drive, for creating an upwardly directed air flow which engages the crop material as it is being conveyed on top of the conveyor assembly. The heavier crop elements, such as loose grape berries and complete grape bunches, remain substantially unaffected by the air flow, but the leaves, which have a larger surface to weight ratio, are lifted up by the air flow and drawn into the fan. The extracted leaves are expelled by the fan through a discharge duct 33 mounted to the rear of the frame 2, behind the harvesting assembly 5. The leaves are deposited between the rows of vines.

By adjusting the rotational speed of the fan rotor 32, e.g. by controlling the flow rate of the hydraulic pomp feeding the fan motor, a more or less powerful action of the extraction mechanism 27 on the material on top of the conveyor assemblies 20 can be realised. When the leaves are dry and easily removable, the rotor speed may be lowered. When the proportion of leaves in the crop material increases or when they become more adhesive, it may be required to increase the rotor speed for effectively cleaning the crop.

Figure 2:
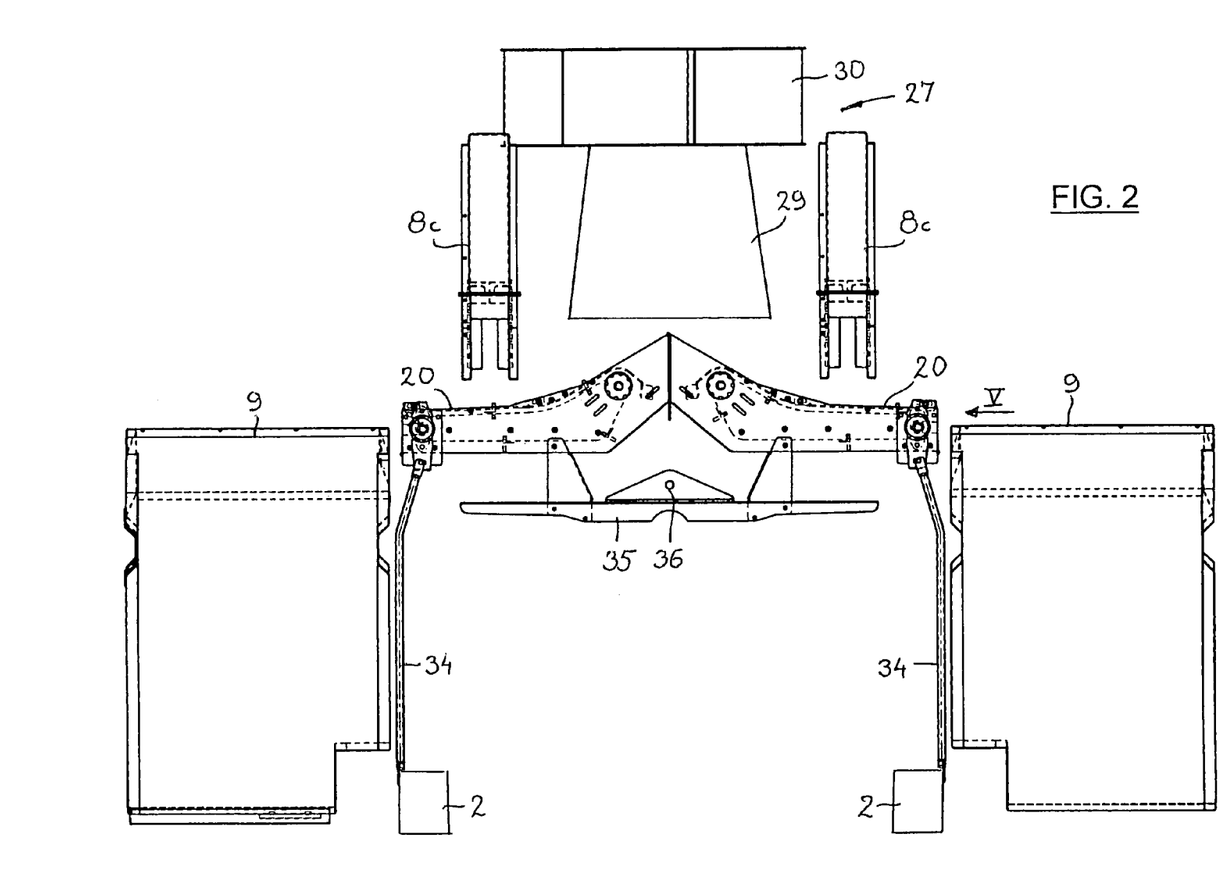
FIG. 2 is a detailed front view of the transverse conveyors as seen in the direction of arrow 11 of FIG. 1.

As shown in FIG. 2, the conveyor assemblies 20 are interconnected at their inwards ends. Their outward ends are affixed by struts 34 on both sides of the assemblies 20 to longitudinal beams of the main frame 2. Their middle portions are sustained by a central support 35 which is connected to the subframe of the harvesting assembly through a pivot 36 having an oscillation axis 36 coinciding with the oscillation axis of the subframe to the main frame 2. This mounting provides for a fixed position of the conveyor assemblies 20 relative to the bins 9.

Figure 3:
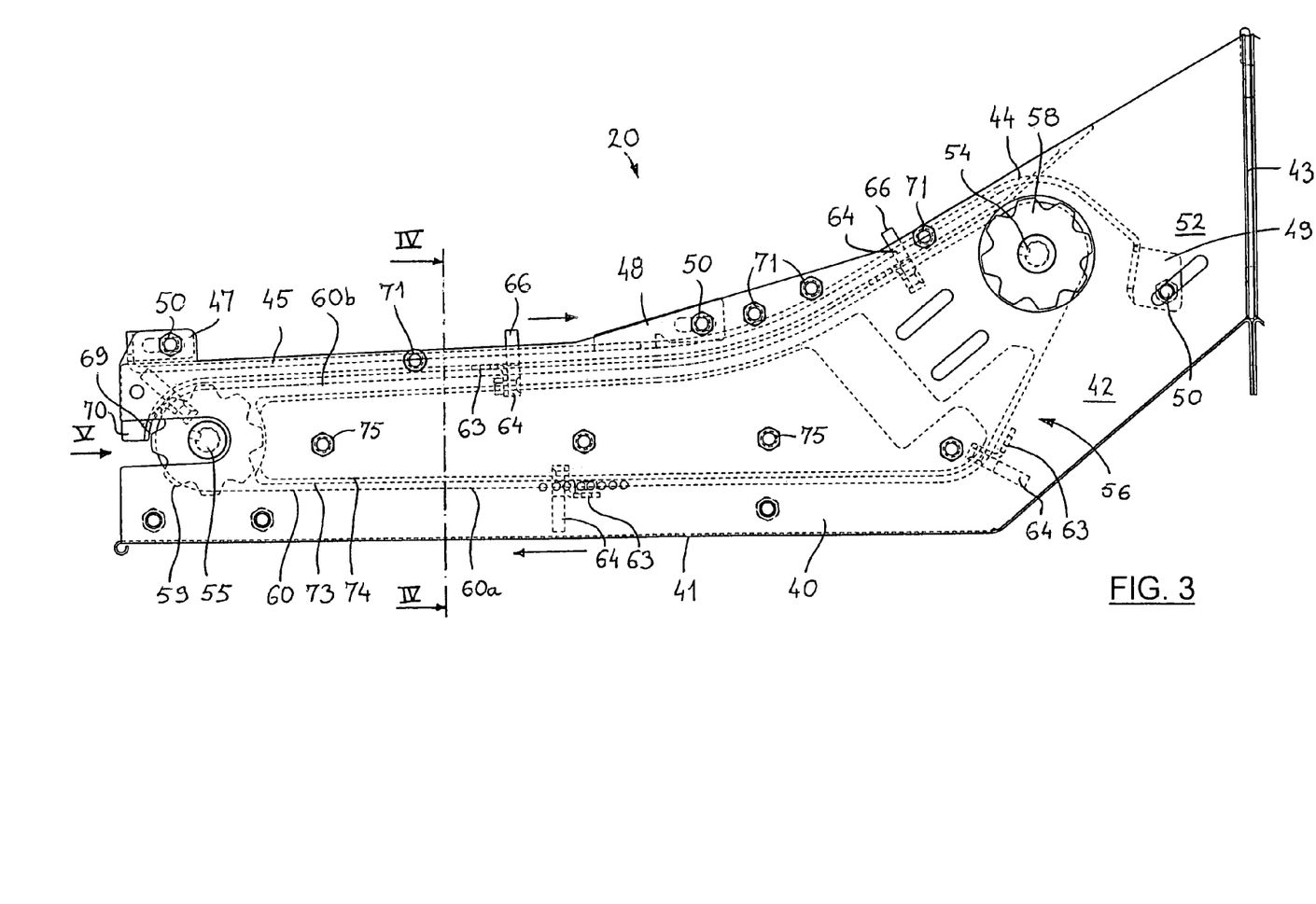
FIG. 3 is a more detailed view of one of the transverse conveyors of FIG. 2.
Figure 4:
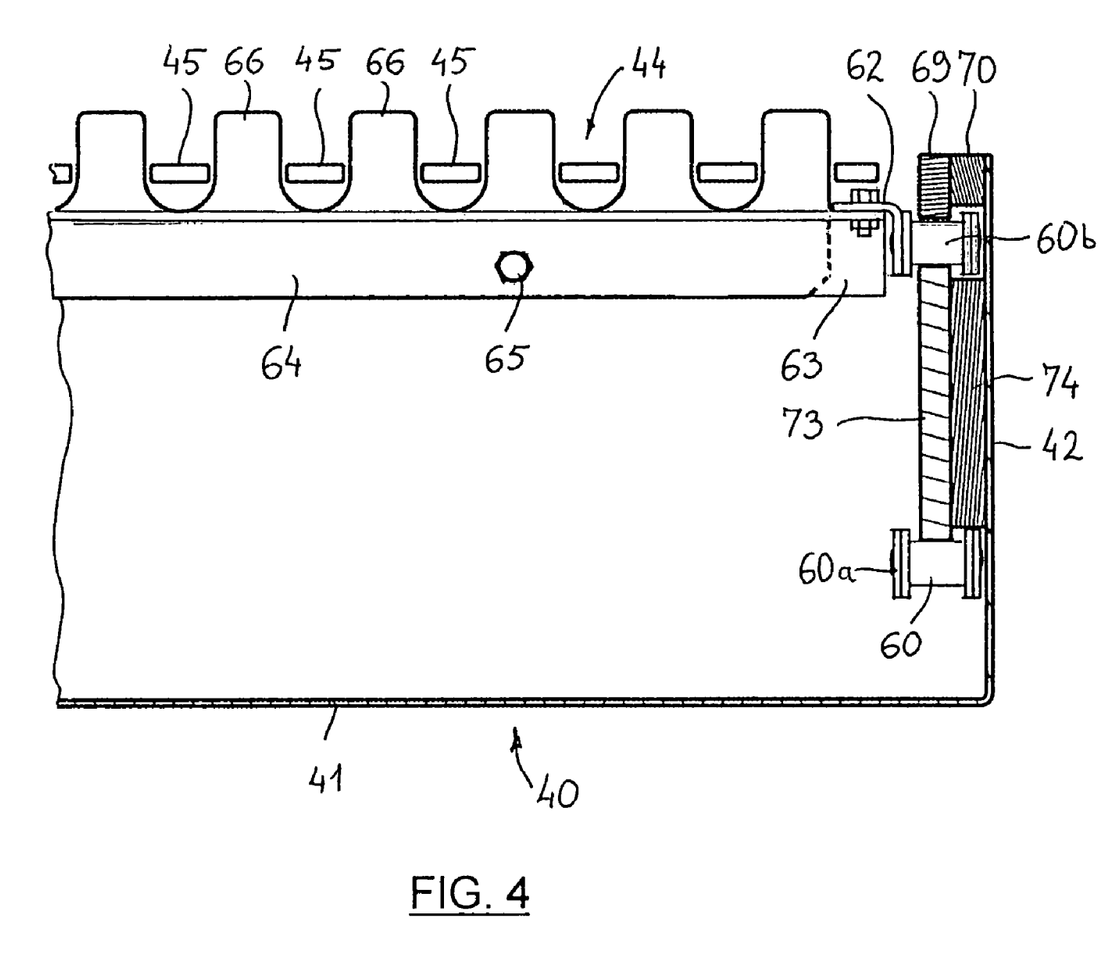
FIG. 4 is a cross sectional of the transverse conveyor, taken along line IV-IV of FIG. 3.

The left and right conveyor assemblies 20 are symmetrical and only one will be described in further detail hereafter. As shown in FIGS. 3 and 4, each conveyor assembly 20 comprises an open duct or channel 40 having a substantially horizontal bottom 40 and a pair of side walls 42. The inner portion of the bottom 40 and the side walls 42 are inclined upwardly towards an inner wall 43. The outer portion of the bottom extends above the bin 9. The upper part of the channel 40 is provided with a grate 44 which comprises a plurality of slats 45 extending between and parallel to the side walls 42. In the illustrated embodiment the grate is cut out of a plate of stainless steel. At the sides the grate 44 has lugs 47-49 for receiving bolts 50 by which the grate is attached to the side walls 42 of the channel 40.

The inner portion of the grate 44 is curved upwardly, in the direction of the extraction hood 29, and ends at a substantial distance from the inner wall 43. The space between the inner edge of the grate 44 and the inner wall 43 is open and constitutes a passage area 52 which allows the passage of bunches of grapes to the bottom 41 of the channel 40.

Through the side walls 42 extend inner and an outer shafts 54, 55 of an endless conveyor mechanism 56. The outer shaft 55 is installed near the outlet portion of the channel 40. The inner shaft 54 is provided below the upwardly curved portion of the grate 44. Adjacent the inner side of the side walls 42 the shafts 54, 55 carry sprockets 58, 59 around which a pair of chains 60 has been wrapped.

At regular intervals the links of the chains 60 are provided with ears 62 which extend into the interior of the channel 41. Transverse angled slats 63 are bolted to opposite ears, thereby spanning the full width of the channel 41. Combs or rakes 64 are affixed by bolts 65 to the upright parts of the angled slats 63. The rakes 64 are provided with a series of teeth 66 which, in the upper run 60b of the conveyor mechanism 56, extend between the grate slats 45 for engaging any crop material resting on top of the grate 44. The rake 64 is made out of a wear-resistant plastic material, e.g. polyamide.

In order to maintain a fixed distance between the tips of the teeth 66 and the surface of the curved grate 44, the upper run 60b of the chain is guided along an upper guide plate 69 which is affixed adjacent the upper rim of the side wall 42. The guide plate 69 may be a wear part, made out of low friction material such as polyamide. The space between the guide plate 69 and the side wall 42 is filled with an upper fill plate 70. Both the fill plate 70 and the guide plate 69 are affixed to the side wall 42 by mechanism of bolt and nut connections 71. The lower rim of the guide plate 69 extends parallel to the grate such that, when the conveyor mechanism 56 is driven through one of the shafts 54, 55, the upper run 60b of the chain is stretched and forced against the rim and the teeth 66 follow a path parallel to the grate slats 45.

An intermediate guide plate 73 is provided between the lower and upper chain runs 60a, 60b. This guide plate is mounted to the back of a second fill plate 74 and the side wall 42 by mechanism of bolt and nut connections 75, such that it lies in the same plane as the upper guide plate 69. The upper rim of the intermediate guide plate 73 extends a fixed distance, slightly exceeding the diameter of the chain rollers, from the lower rim of the upper guide plate 69. The chain rollers in the upper chain run 60b are positively guided in between the guide plates 69, 73 such that the oscillation of the rakes 64 and their teeth 66 is limited during their travel along the grate 44.

The lower rim of the intermediate guide plate 73 extends parallel to the channel bottom 41. The distance between the rim and the bottom has been chosen such that in the lower conveyor run 60a, the rake teeth 66 engage the surface of the bottom 41 or pass at a small distance therefrom. No further guide plate is necessary below the intermediate plate 73, as a possible slackening of the chain 60 has no substantive effect on the path followed by the teeth 66 which continue to sweep the bottom 41.

One of the shafts 54, 55 is driven by an appropriate motor mechanism, e.g. a hydraulic drive. The speed may be variable in order to adjust for different crop flow rates.

During harvesting operations, crop material, including grape bunches, loose grape berries, juice and leaves, is received in the buckets 16 of the elevator conveyors 8 and transported to the upper part of the harvester 1. In their upper run 8c the buckets 16 are turned over and the crop material is deposited onto the outer section of the grate 44. Loose grape berries and juice migrate between the grate slats 45 and the upper and lower runs of the conveyor mechanism 56. The distance between successive rakes 64 is substantially larger than the diameter of the berries, such that the movement of the rakes does not hinder the passage of berries in between. The loose berries and juice are received at the bottom 41 of the channel 40 where they are engaged by the rakes 64 in the lower run 60a.

Figure 5:
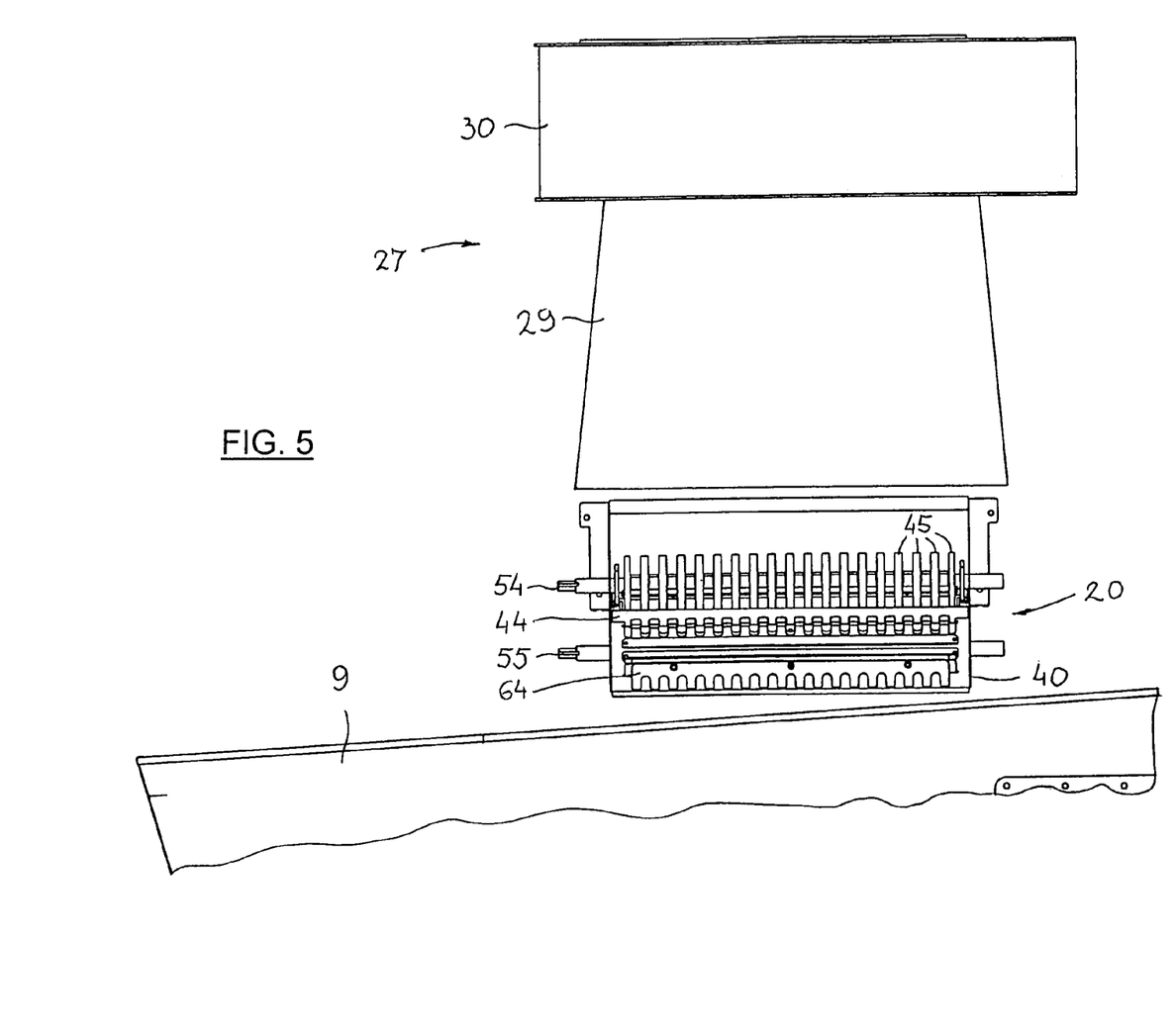
FIG. 5 is a side view of the transverse conveyor and the extraction fan as seen in the direction of arrow V in FIG. 2.

Grape bunches and leaves cannot pass through the grate slats 45 and are retained on the upper grate surface. The rake teeth 66 engage this portion of the crop material and convey it inwardly and upwardly along the grate 44. At the end of the grate the crop material is subject to the air stream of the extraction mechanism 27. The grape bunches are not affected by this air stream and fall through the passage area 52 to an inclined section of the channel bottom 41. The leaves however, having a larger surface to mass ratio, are lifted up and sucked into the fan 30. The extraction mechanism 27 deposit the leaves through the duct 33 behind the grape harvester 1.

In the upper run 60b the rakes 64 contact the grate slats 45 and act as a scraper, not only displacing the grapes on the grate, but also removing material stuck to the sides of the slats 45.

In the lower run 60a the rakes 64 engage the bunches which passed through passage area 52, and the loose berries and juice which passed through the grate 44, and convey this wanted portion of the crop material along the channel bottom 41 towards the bin 9.

Figure 6:
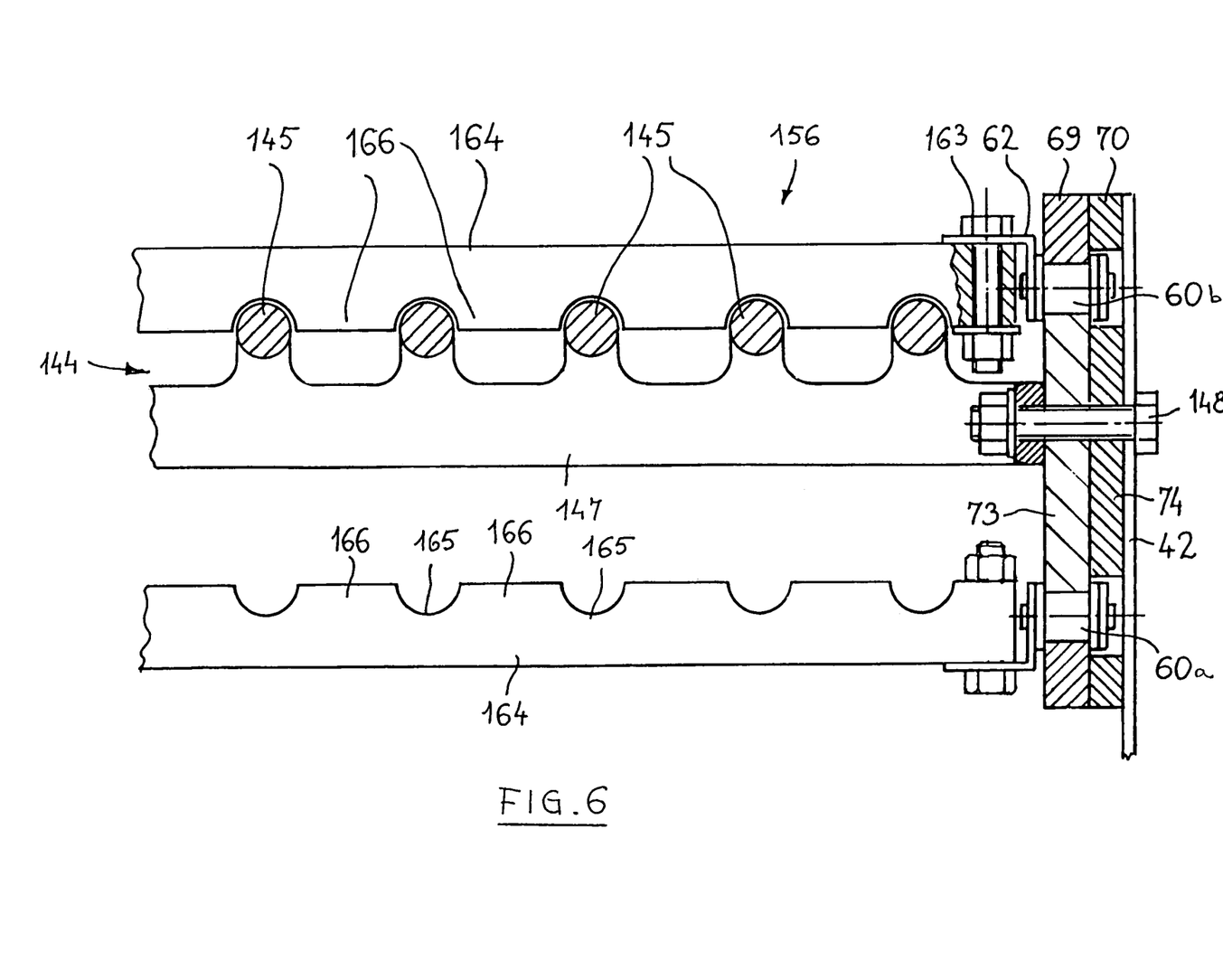
FIG. 6 is a view similar to FIG. 4 of an alternative embodiment of a transverse conveyor.

FIG. 6 shows an alternative embodiment of the permeable transverse conveyor assembly 20. Herein the grate 144 is constituted by a set of parallel rods 145 having a circular cross section. These rods may be made out of stainless steel. Near their inner and outer ends the rods 145 are affixed, e.g. welded to transverse supports 147 which are removably attached by bolt and nut connections 148 to the channel walls 42. The distance between adjacent rods 145 is chosen to permit the passage of loose berries inbetween. The conveyor mechanism 156 comprise transverse slats 164 which are affixed by bolt and nut connections 163 to the ears 62 of the chain 60. The lower section of the slats 164 is provided with a series of notches which match the cross section of rods. In their upper run 60b, the slats 164 are guided along and on top of the rods 145. The slat sections 166 between the notches help to guide the slats 164 while wiping stray material from the grate 144. The lower run of the conveyor mechanism 156 follows a path below the grate as described above.

Grape bunches and leaves deposited on top of the conveyor assembly are retained by the grate 144 and conveyed towards the cleaning or extraction mechanism 27 by the slats 164 which sweep the top of the grate. Loose berries and juice migrate through the grate and between the upper and lower runs of the conveyor mechanism.

Accordingly is provided a permeable conveyor and cleaning arrangement in which the juice follows a trajectory wherein which it is not subject to the cleaning air stream and guided to the bin, together with the grapes and grape bunches. Furthermore, loose berries do not have to follow the longer trajectory of the bunches on top of the grate 44, but can pass immediately through the grate and the conveyor runs 60a, 60b to a point closer to the bins 9.

Although the present invention has been described with reference to a particular type of fruit harvester and conveyor assembly, it will be appreciated that other embodiments can be thought of, without departing however from the original idea of the invention as defined by the claims. For example, the grate may be constituted by longitudinal elements having a square or triangular cross section. The grate elements may be made out of another wear- and corrosion resistant material, such as composite material. The full channel bottom may be inclined to constitute a chute which guides the crop material to the bins, without interaction of the lower conveyor run.

It is also conceivable to use a rake conveyor which is installed above the grate, the conveyor having a lower run in which the rakes engage the material on the grate. The conveyor need not comprise a chain. For instance the rakes may be attached to a pair of V-belts or similar flexible, endless drive mechanism. Where a pair of conveyor mechanism is used, it is also possible to use two distinct extraction mechanism, one being disposed over each grate. The invention may also be used on a pull-type, instead of a self-propelled harvesting machine.

The invention claimed is:

1. A fruit harvesting machine, comprising:
   a frame equipped with mechanism for travelling the frame over a field;
   a harvesting assembly for detaching crop material, comprising fruit and material other than fruit, from trees, shrubs and the like standing on said field;
   a conveyor assembly for receiving said detached crop material and transporting said fruit either directly or indirectly to a container; and
   a cleaning mechanism installed adjacent a section of said conveyor assembly for removing said material other than fruit from said detached crop material;
   wherein said conveyor assembly comprises:
   a stationary grate mechanism for retaining thereon solid portions of said crop material and having apertures allowing passage therethrough of juice from said fruit;
   a movable conveyor mechanism comprising a spaced crop-engaging elements for engaging and moving said solid crop portions along said grate mechanism towards said cleaning mechanism and allowing passage in between, the conveyor mechanism being permeable for allowing the passage of said juice therethrough.

2. A fruit harvesting machine according to claim 1, wherein said grate mechanism is made out of corrosion resistant material.

3. A fruit harvesting machine according to claim 2, wherein said corrosion resistant material is chosen from stainless steel or composite material.

4. A fruit harvesting machine according to claim 2, wherein said grate mechanism is made out of a metal sheet.

5. A fruit harvesting machine according to claim 1, wherein said grate mechanism comprises a plurality of narrow members extending parallel to each other in the normal direction of transport of said movable conveyor mechanism.

6. A fruit harvesting machine according to claim 5, wherein said narrow members comprise parallel rods.

7. A fruit harvesting machine according to claim 1, wherein said conveyor mechanism comprises:
   an upper run which is substantially equidistant to said grate mechanism for engaging and moving said detached solid fruit portions and material other than fruit along said grate mechanism; and
   a lower run extending below said upper run and below said grate mechanism.

8. A fruit harvesting machine according to claim 7, wherein said upper run said crop-engaging elements extend through said grate mechanism.

9. A fruit harvesting machine according to claim 1, wherein said conveyor assembly further comprises a channel mechanism installed below said grate mechanism for receiving said juice.

10. A fruit harvesting machine according to claim 7, wherein said lower run said crop-engaging elements extend into said channel mechanism for engaging and moving crop material along the bottom of said channel mechanism.

11. A fruit harvesting machine according to claim 8, wherein said lower run said crop-engaging elements extend into said channel mechanism for engaging and moving crop material along the bottom of said channel mechanism.

12. A fruit harvesting machine according to claim 9, wherein said lower run said crop-engaging elements extend into said channel mechanism for engaging and moving crop material along the bottom of said channel mechanism.

13. A fruit harvesting machine according to claim 12, wherein said lower run the tips of said crop-engaging elements contact or pass along at a short distance from the bottom of said channel mechanism for sweeping said bottom during operation of said conveyor mechanism.

14. A fruit harvesting machine according to claim 13, wherein said conveyor assembly is provided with a passage area at the end of sad grate mechanism for allowing the passage of said solid fruit portions to the bottom of said channel mechanism.

15. A fruit harvesting machine according to claim 14, wherein adjacent crop-engaging elements are spaced for allowing the passage of loose fruit berries in between.

16. A fruit harvesting machine according to claim 15, wherein said apertures of said grate mechanism are dimensioned for allowing the passage of loose fruit berries therethrough.

17. A fruit harvesting machine according to claim 16, wherein said conveyor mechanism comprises transverse slats.

18. A fruit harvesting machine according to claim 17, wherein said transverse slats are provided with arrays of said crop-engaging elements.

19. A fruit harvesting machine according to claim 18, wherein said crop engaging elements are connected to flexible, endless drive mechanism.

20. A fruit harvesting machine according to claim 19, wherein said endless drive mechanism comprise a pair of transversely spaced chains.

21. A fruit harvesting machine according to claim 20, wherein said endless drive mechanism are provided along opposite walls of said channel mechanism.

22. A fruit mechanism machine according to claim 21, wherein said endless drive mechanism and said cleaning mechanism are driven by a speed-adjustable motor mechanism.

23. A fruit mechanism machine according to claim 22, wherein said grate mechanism has an upwardly inclined portion adjacent said cleaning mechanism.

24. A fruit harvesting machine according to claim 23, wherein said conveyor assembly is provided with guide mechanism for said flexible drive mechanism, said guide mechanism being operable to hold said crop-engaging elements at a fixed distance from said grate mechanism along the portion of the path of said elements.

25. A fruit harvesting machine according to claim 24, wherein said guide mechanism comprise guide plates which are affixed above an upper run of said conveyor mechanism and between an upper and lower run of sad conveyor mechanism.

26. A fruit harvesting machine according to claim 9, wherein said grate mechanism and said conveyor mechanism are affixed to said channel mechanism for joint installation of said conveyor assembly on said harvesting machine.

27. A fruit harvesting machine according to claim 26, further comprising two opposite conveyor assemblies and a single cleaning mechanism installed adjacent a section of both said conveyor assemblies for removing said material other than fruit from both conveyor assemblies.

28. A fruit harvesting machine according to claim 27, wherein said cleaning mechanism have a deposit duct along rear end of said harvesting assembly.

* * * * *